(12) United States Patent
Sakoda

(10) Patent No.: US 11,424,568 B2
(45) Date of Patent: Aug. 23, 2022

(54) ELECTRIC CONNECTOR HAVING SHIELDING PLATE, AND MANUFACTURING METHOD FOR HOUSING OF ELECTRIC CONNECTOR

(71) Applicant: HIROSE ELECTRIC CO., LTD., Kanagawa (JP)

(72) Inventor: Yusuke Sakoda, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 1 day.

(21) Appl. No.: 17/255,259

(22) PCT Filed: Jun. 14, 2019

(86) PCT No.: PCT/JP2019/023701
§ 371 (c)(1),
(2) Date: Dec. 22, 2020

(87) PCT Pub. No.: WO2020/004077
PCT Pub. Date: Jan. 2, 2020

(65) Prior Publication Data
US 2021/0226374 A1 Jul. 22, 2021

(30) Foreign Application Priority Data
Jun. 25, 2018 (JP) .............................. JP2018-119778

(51) Int. Cl.
*H01R 43/18* (2006.01)
*H01R 13/502* (2006.01)
(Continued)

(52) U.S. Cl.
CPC ......... *H01R 13/502* (2013.01); *H01R 13/405* (2013.01); *H01R 13/6585* (2013.01); *H01R 43/18* (2013.01)

(58) Field of Classification Search
CPC ................ H01R 13/502; H01R 13/405; H01R 13/6585; H01R 43/18; H01R 12/7052;
(Continued)

(56) References Cited

U.S. PATENT DOCUMENTS 5,221,212 A * 6/1993 Davis .................. H01R 12/724
439/108
6,093,046 A 7/2000 Chiou et al.
(Continued)

FOREIGN PATENT DOCUMENTS

CN 102195158 A 9/2011
CN 102544924 A 7/2012
(Continued)

OTHER PUBLICATIONS

International Search Report (ISR) dated Aug. 13, 2019 filed in PCT/JP2019/023701.
(Continued)

*Primary Examiner* — Truc T Nguyen
(74) *Attorney, Agent, or Firm* — Rankin, Hill & Clark LLP

(57) ABSTRACT

To effectively prevent damage and position displacement of a die to provide an electric connector having a shield housing space with accurately-controlled shape and size. The electric connector includes a housing having a base and a plate-shaped body, multiple first terminals provided on one plate surface of the plate-shaped body and multiple second terminals provided on the other plate surface facing the one plate surface, a shield arranged among the multiple first terminals and the multiple second terminals, and a metal shell forming, between the one plate surface and the other plate surface, a fitting space in which a partner connector is to be fitted. The base has a first housing portion for housing part of the shield. The plate-shaped body has a second
(Continued)

housing portion for housing another part of the shield. The second housing portion is communicated with the first housing portion in the direction of fitting to or release from the partner connector. The second housing portion is, in the fitting-release direction, communicated with through-holes provided at an end wall of the plate-shaped body positioned on the side of fitting to the partner connector.

7 Claims, 11 Drawing Sheets

(51) Int. Cl.
*H01R 13/405* (2006.01)
*H01R 13/6585* (2011.01)

(58) Field of Classification Search
CPC .. H01R 12/716; H01R 13/6587; H01R 24/62; H01R 2107/00; B29C 45/14639
See application file for complete search history.

(56) References Cited

U.S. PATENT DOCUMENTS

| | | | |
|---|---|---|---|
| 8,123,550 B2 | 2/2012 | Hoshino et al. | |
| 8,388,379 B2 | 3/2013 | Sasaki et al. | |
| 8,398,439 B1* | 3/2013 | Wang .................. | H01R 12/57 439/607.54 |
| 9,559,469 B2 | 1/2017 | Nishimori et al. | |
| 10,644,447 B2 | 5/2020 | Nishio et al. | |
| 11,258,212 B2* | 2/2022 | Iwamoto ............. | H01R 13/6582 |
| 2008/0050970 A1* | 2/2008 | Chang ................. | H01R 12/725 439/607.41 |
| 2008/0311801 A1* | 12/2008 | Chen .................... | H01R 24/60 439/733.1 |
| 2011/0223790 A1 | 9/2011 | Hoshino et al. | |
| 2012/0071030 A1 | 3/2012 | Sasaki et al. | |
| 2013/0273780 A1 | 10/2013 | Kimura et al. | |
| 2015/0214669 A1* | 7/2015 | Chen .................... | H01R 13/40 439/607.24 |
| 2016/0149350 A1* | 5/2016 | Kao ..................... | H01R 12/724 439/607.05 |
| 2016/0197442 A1 | 7/2016 | Lin et al. | |
| 2016/0315425 A1 | 10/2016 | Nishimori et al. | |
| 2017/0117671 A1* | 4/2017 | Chang ................ | H01R 13/6594 |
| 2017/0279232 A1* | 9/2017 | Long ..................... | H01R 24/60 |
| 2018/0277992 A1 | 9/2018 | Nishio et al. | |
| 2022/0047102 A1* | 2/2022 | Uland .................. | A47G 9/0215 |

FOREIGN PATENT DOCUMENTS

| | | | | |
|---|---|---|---|---|
| CN | 207098116 U | | 3/2018 | |
| CN | 207490223 | * | 6/2018 | ............. H01R 13/52 |
| JP | 7-114952 A | | 5/1995 | |
| JP | 8-321358 A | | 12/1996 | |
| JP | 9-199231 A | | 7/1997 | |
| JP | 2009-283340 A | | 12/2009 | |
| JP | 2011-192470 A | | 9/2011 | |
| JP | 2013-222579 A | | 10/2013 | |
| JP | 2017-37851 A | | 2/2017 | |
| JP | 2017-62915 A | | 3/2017 | |

OTHER PUBLICATIONS

Chinese Office Action (CNOA) dated Oct. 18, 2021 for corresponding Chinese Patent Application No. 201980031445.7.
Extended European Search Report (EESR) dated Mar. 3, 2022, for the corresponding European Patent Application No. 19825671.1.

* cited by examiner

ELECTRIC CONNECTOR HAVING SHIELDING PLATE, AND MANUFACTURING METHOD FOR HOUSING OF ELECTRIC CONNECTOR

TECHNICAL FIELD

The present invention relates to an electric connector having a shield. More specifically, the present invention relates to an electric connector having a shield among terminals provided on one surface of a plate-shaped body and terminals provided on the other surface of the plate-shaped body and the method for manufacturing a housing of the electric connector.

BACKGROUND ART

JP-A-2017-37851 (Patent Literature 1) discloses one example of the above-described electric connector type. This electric connector includes first terminals, second terminals, and a shield. The first terminal includes a first connection portion arrayed on one surface of a plate-shaped fitting portion and connected to a partner connector. The second terminal includes a second connection portion arrayed on the surface of the fitting portion opposite to the one surface and connected to the partner connector. The shield is a plate-shaped member provided between the first connection portion and the second connection portion of the fitting portion. The steps of manufacturing this electric connector include the step of forming a primary molded portion configured such that the multiple first terminals and the shield are integrally provided by insert molding and the step of forming a housing by forming a secondary molded portion configured such that the primary molded portion and multiple terminals are integrally provided by insert molding.

CITATION LIST

Patent Literature

PATENT LITERATURE 1: JP-A-2017-37851

SUMMARY OF INVENTION

Problems to be Solved by Invention

As clearly seen, in the technique disclosed in Patent Literature 1, the shield can be provided integrally with the housing by insert molding. Thus, a housing space for housing the shield is not necessarily provided in advance.

On the other hand, in the technique of attaching the shield by press-fitting, the housing space for housing the shield needs to be formed in advance by means of a die. With recent device size reduction, the size of the housing space has decreased. For example, the thickness of the housing space is only about 0.1 to 0.4 mm in some cases. For forming, by means of the die, such a housing space expanding in an in-plane direction with the slight thickness, resin needs to be injected into the die defining the housing space with extremely-high pressure. As a result, damage of the die or position displacement of the die caused by the pressure of the injected resin occurs, and for this reason, it is difficult to accurately control the shape and size of the housing space.

The invention of the present application has been made for solving these problems of the typical technique. An object of the invention of the present application is to effectively prevent damage and position displacement of a die to provide an electric connector having a shield housing space with accurately-controlled shape and size.

Solution to Problems

In order to address the above-described object, an electric connector according to an aspect of the present invention includes: a housing including a base and a plate-shaped body formed on a side of the base fitted to a partner connector; multiple first terminals attached to the housing and provided in a state in which at least part of the multiple first terminals is exposed at one plate surface of the plate-shaped body and multiple second terminals provided in a state in which at least part of the multiple second terminals is exposed at the other plate surface of the plate-shaped body, the one plate surface and the other plate surface facing each other; a shield attached to the housing and arranged among the multiple first terminals and the multiple second terminals in a thickness direction of the plate-shaped body; and a metal shell attached to the housing and forming, between the one plate surface and the other plate surface, at least part of a fitting space in which part of the partner connector is to be fitted. The base has a first housing portion for housing part of the shield, the plate-shaped body has a second housing portion communicated with the first housing portion in a direction of fitting to or release from the partner connector and provided for housing another part of the shield, and the second housing portion is, in the fitting-release direction, communicated with a through-hole provided at an end wall of the plate-shaped body positioned on a side of fitting to the partner connector.

In the electric connector according to the aspect, the base may have, along fitting-release direction, multiple first terminal insertion holes into which the multiple first terminals are to be inserted and multiple second terminal insertion holes into which the multiple second terminals are inserted, the multiple first terminal insertion holes may be, in the fitting-release direction, continuous to multiple first grooves formed at the one plate surface such that the multiple first terminals are each arranged in the multiple first grooves, and the multiple first grooves may be arrayed separately from each other at the one plate surface, and the multiple second terminal insertion holes may be, in the fitting-release direction, continuous to multiple second grooves formed at the other plate surface such that the multiple second terminals are each arranged in the multiple second grooves, and the multiple second grooves may be arrayed separately from each other at the other plate surface.

Further, in the electric connector according to the aspect, at the one plate surface, multiple first protruding portions forming at least part of the multiple first grooves may be provided along the fitting-release direction in a state in which the multiple first protruding portions are aligned with a first wall dividing the multiple first terminal insertion holes from each other in a direction perpendicular to the fitting-release direction, and at the other plate surface, multiple second protruding portions forming at least part of the multiple second grooves may be provided along the fitting-release direction in a state in which the multiple second protruding portions are aligned with a second wall dividing the multiple second terminal insertion holes from each other in the direction perpendicular to the fitting-release direction.

Further, in the electric connector according to the aspect, on an inner wall of the first housing portion on a one-plate-surface side and an inner wall of the second housing portion on the one-plate-surface side along a plate surface direction of the plate-shaped body, multiple first reinforcing portions arrayed separately from each other in the direction perpendicular to the fitting-release direction may be provided to protrude from the inner walls to an inside of the first housing portion and the second housing portion, on an inner wall of the first housing portion on an other-plate-surface side and an inner wall of the second housing portion on the other-plate-surface side along the plate surface direction of the plate-shaped body, multiple second reinforcing portions arrayed separately from each other in the direction perpendicular to the fitting-release direction may be provided to protrude from the inner walls to the inside of the first housing portion and the second housing portion, and each of the multiple first reinforcing portion may be arranged close to the first wall in an in-plane direction perpendicular to the fitting-release direction, and each of the multiple second reinforcing portions may be arranged close to the second wall in the in-plane direction perpendicular to the fitting-release direction.

Moreover, in the electric connector according to the aspect, it is preferred that a first press-fitting portion in which each first terminal is to be press-fitted is formed at each first terminal insertion hole, and the multiple first reinforcing portions are at least provided close to the first press-fitting portion, and a second press-fitting portion in which each second terminal is to be press-fitted is formed at each second terminal insertion hole, and the multiple second reinforcing portions are at least provided close to the second press-fitting portion.

In order to manufacture the electric connector according to the above-described aspect, a method for manufacturing a housing of the electric connector according to an aspect of the present invention includes: preparing at least a first die defining at least part of an outer surface of the end wall of the plate-shaped body and part of the through-hole provided at the end wall and a second die defining a housing space in which the shield is housed and the remaining part of the through-hole provided at the end wall; and manufacturing the housing by filling a space formed by the first die and the second die with resin in a state in which a first portion of the first die for defining the part of the through-hole provided at the end wall and a second portion of the second die for forming the remaining part of the through-hole provided at the end wall are coupled to each other.

Effects of Invention

According to the invention of the present application, damage and position displacement of the die are effectively prevented. Thus, the electric connector having the shield housing space with the accurately-controlled shape and size and the method for manufacturing the housing of the electric connector can be provided.

DESCRIPTION OF EMBODIMENTS

Hereinafter, an electric connector according to one preferred embodiment of the present invention will be described with reference to the attached drawings. For the sake of convenience in description, only the preferred embodiment will be described. Note that such an embodiment is not intended to limit the present invention, needless to say.

Figure 1:
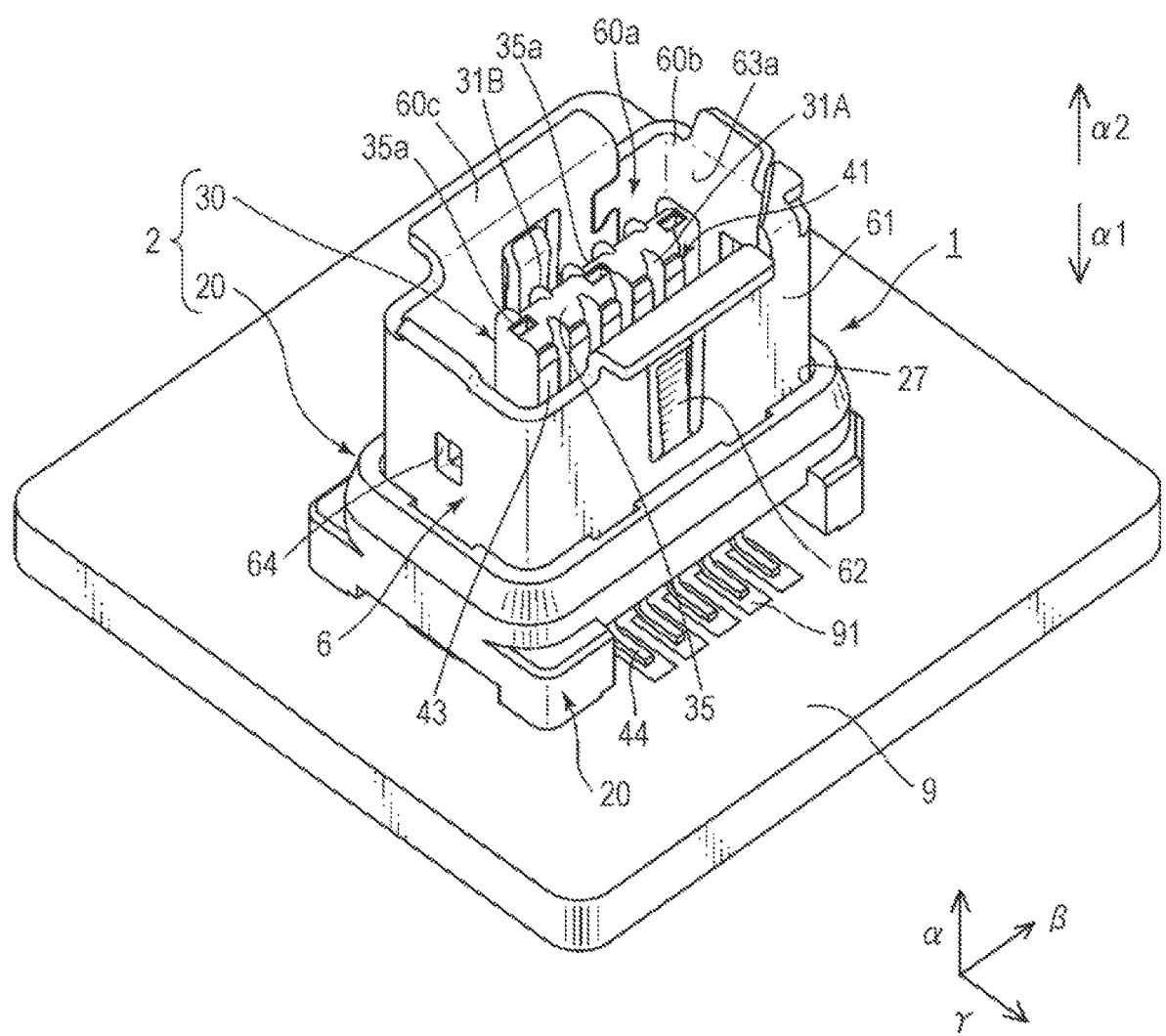
FIG. 1 is a perspective view illustrating one use form of an electric connector according to one embodiment of the present invention.
Figure 2:
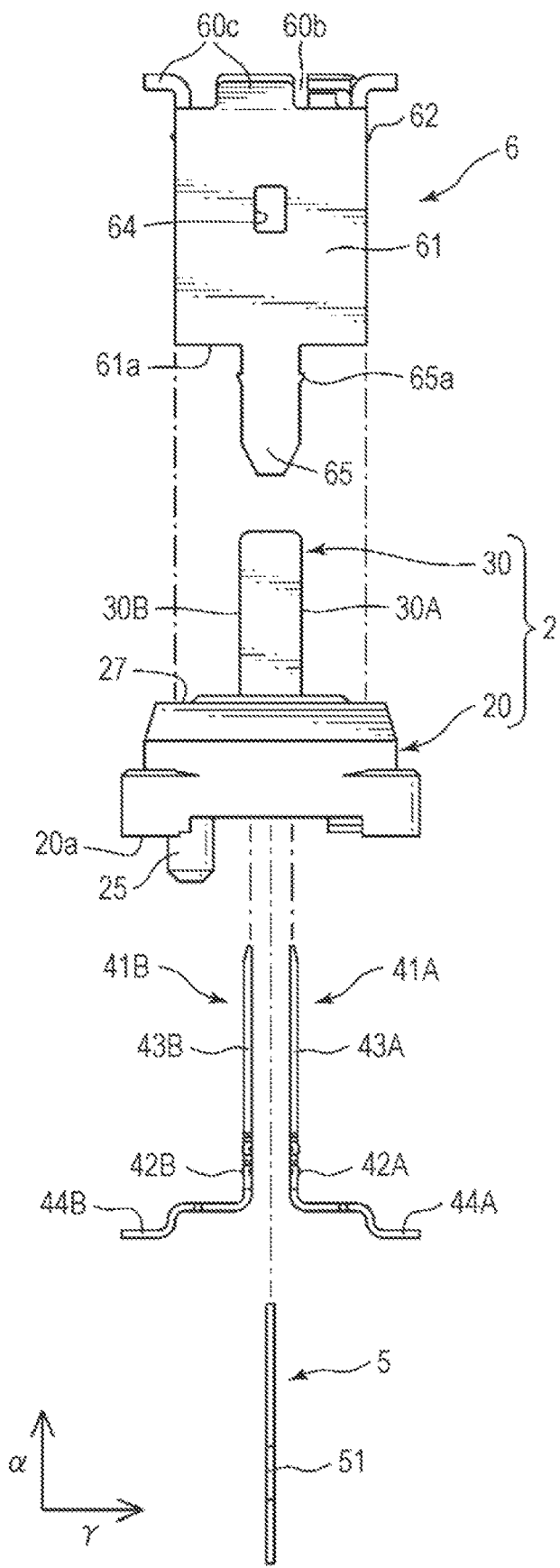
FIG. 2 is an exploded side view of the electric connector of FIG. 1.

FIG. 1 is a perspective view illustrating one use form of an electric connector 1, i.e., a state in which the electric connector 1 is soldered to a substrate 9, and FIG. 2 is an exploded side view of the electric connector 1.

A partner connector (not shown) can be fitted to the electric connector 1 along a fitting direction "α1." Moreover, the partner connector is separated from the electric connector 1 in a release direction "α2" so that the connectors can be released from each other.

Hereinafter, a direction "α" along the fitting direction "α1" and the release direction "α2" with respect to the partner connector will be referred to as an "upper-lower direction" for the sake of convenience. Moreover, a direction "β," which is perpendicular to the upper-lower direction, along a longitudinal direction of a metal shell 6 will be referred to as a "right-left direction." Specifically, the side of fitting to or release from the partner connector will be referred to as an "upper" side with reference to the electric connector 1. Note that in the present specification, these terms "upper," "lower," "left," and "right" are merely used for the sake of convenience in distinguishing directions. For example, the "upper" and the like do not have special meanings. For example, the direction along the "α" direction may be referred to as the "right-left direction" (the same applies below).

The electric connector 1 includes a resin housing 2 and multiple terminals 41, the metal shell 6, and a shield 5 attached to the housing 2.

The housing 2 includes a flat substantially-rectangular-parallelepiped base 20 and a thin plate-shaped body 30. The plate-shaped body 30 stands to extend upward of the base 20, i.e., extend to the side of fitting to the partner connector. Components of the electric connector 1 including the housing 2 have approximately bisymmetrical shapes, except for the plate-shaped body 30. The plate-shaped body 30 has a point symmetrical shape as viewed in plane. Note that as in other portions, the plate-shaped body 30 may have a bisymmetrical shape.

The base 20 is formed in a step shape in the upper-lower direction. For example, the base 20 may be formed in a two-step shape. A protrusion 25 extends downward of a bottom surface 20a of a lower step. The protrusion 25 can be used for positioning the housing 2 on the substrate 9 and fixing the housing 2 to the substrate 9.

The plate-shaped body 30 extends upward of an upper step of the base 20, i.e., extends to the side of fitting to the partner connector. The thickness of the plate-shaped body 30 may be, for example, an extremely-thin thickness of about 1 to 3 mm. On one plate surface 30A and the other plate surface 30B of the plate-shaped body 30 facing each other in a thickness direction "γ" of the plate-shaped body 30, multiple first terminals 41A and multiple second terminals 41B are arrayed. Each of characters "A," "B" as described herein is a character indicating one plate surface side of the plate-shaped body 30. In a case where it is not necessary to distinguish one plate surface 30A and the other plate surface 30B from each other, these characters may be omitted (the same applies below).

The shield 5 has a flat plate shape, and for example, has an extremely-thin thickness of about 0.1 to 0.3 mm. The shield 5 is inserted into the housing 2 from a lower step side to an upper step side of the base 20. The shield 5 is placed with the shield 5 extending over both of the base 20 and the plate-shaped body 30. When the shield 5 is placed in the housing 2, the shield 5 is specifically arranged among the multiple first terminals 41A and the multiple second terminals 41B in the thickness direction "γ" of the plate-shaped body 30. With this configuration, the first terminals 41A and the second terminals 41B are shielded from each other. As illustrated in FIG. 1, when the shield 5 is fixed to, e.g., the substrate, the substantially entirety of the shield 5 is covered with the housing 2. In this state, only a minute portion of the shield 5 is slightly exposed to the outside through through-holes 35a of the housing 2. As described below, the through-holes 35a are inevitably formed when a housing space for housing the shield 5 is formed using a die.

The terminals 41 include five first terminals 41A arrayed on one plate surface 30A of the plate-shaped body 30 and five second terminals 41B arrayed on the other plate surface 30B. In the present embodiment, all of these terminals have the same shape. Note that these terminals do not necessarily have the same shape. Considering prevention of crosstalk, the first terminals 41A and the second terminals 41B are arrayed in a zigzag pattern on the plate-shaped body 30.

Figure 3:
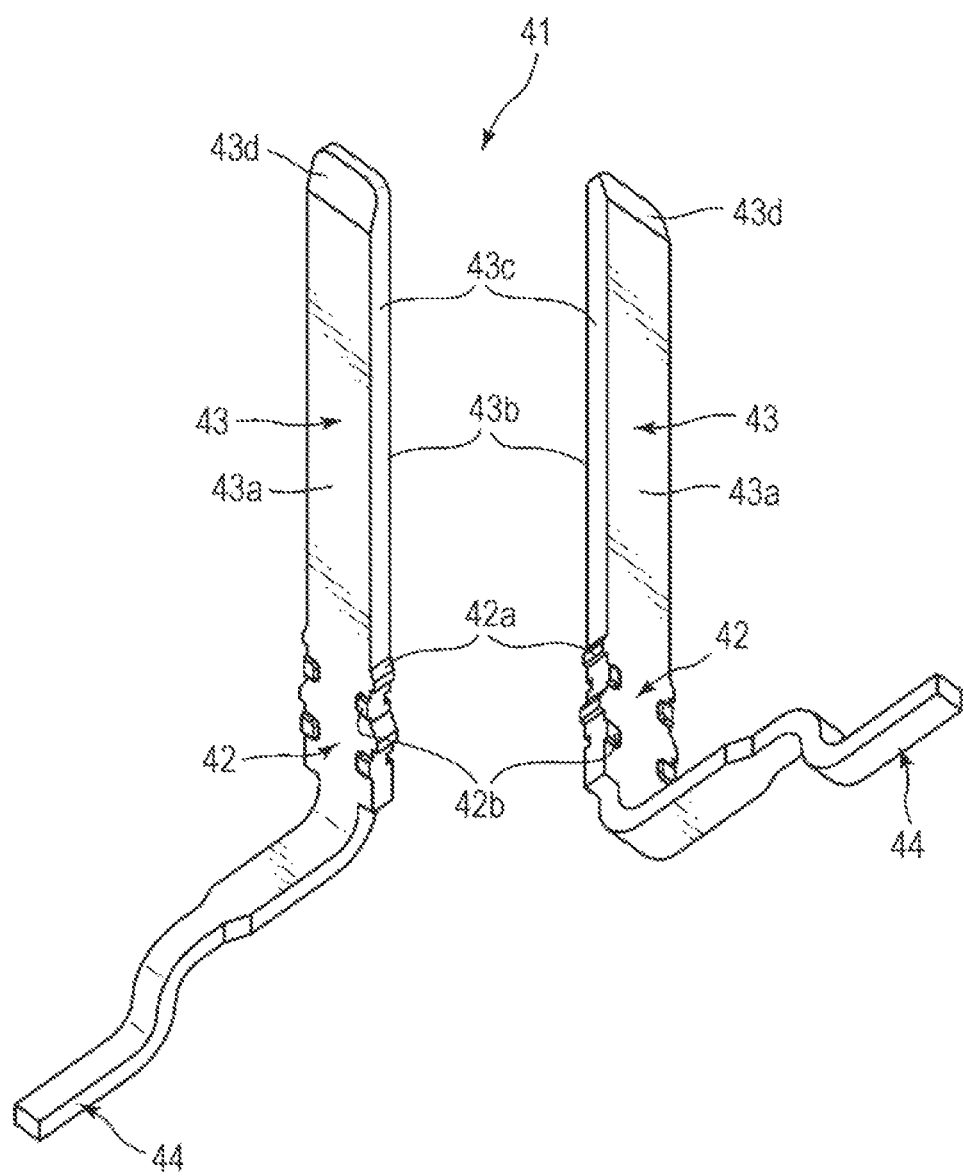
FIG. 3 is an enlarged perspective view of a terminal used for the electric connector of FIG. 1.

FIG. 3 illustrates an enlarged perspective view of the terminal 41. Each terminal 41 has a substantially L-shape as viewed laterally. Each terminal 41 includes a contact portion 43 contactable with the partner connector and a press-fitting portion 42 to be press-fitted to a predetermined portion of the base 20, and further includes a mounting portion 44 to be soldered to, e.g., a pad 91 (see FIG. 1) of the substrate.

When the terminal 41 is, at the contact portion 43, placed on the housing 2, a surface 43a of the terminal 41 is arranged on one of the plate surfaces 30A, 30B of the plate-shaped body 30 with part of the surface 43a being exposed. On the other hand, a bottom surface 43b and side surfaces 43c of the terminal 41 are arranged with these surfaces being embedded in the housing 2.

At the press-fitting portion 42, laterally-protruding press-fitting protrusions 42a are provided on each of the right and left side surfaces 43c of the terminal 41. These press-fitting protrusions 42a are press-fitted to a predetermined portion of the housing 2, specifically the predetermined portion of the base 20, when the terminal 41 is placed in the housing 2. Accordingly, the terminal 41 is reliably fixed to the housing 2. At the press-fitting portion 42, biasing protruding portions 42b protruding outward of the surface 43a are provided in the vicinity of the press-fitting protrusions 42a at the surface 43a of the terminal 41. When the terminal 41 is placed in the housing 2, the biasing protruding portions 42b can contact a predetermined wall surface of the base 20 to press a tip end portion 43d of the contact portion 43 toward a bottom surface 43b side of the terminal 41. Thus, detachment of the terminal 41 from the housing 2, specifically detachment of the easily-detachable tip end portion 43d of the contact portion 43 of the terminal 41, can be effectively prevented.

The shell 6 includes a main body 61 formed in a substantially tubular shape. Directing portions 60c are provided at an end portion of an opening 60b of the main body 61 on the side of fitting to the partner connector. The directing portions 60c are opened to the outside so that the partner connector can be directed into the shell 6. On the other hand, at an end portion of the main body 61 on a side opposite to the side of fitting to the partner connector, a pair of fixing pieces 65 is provided. The pair of fixing pieces 65 extends to the side of attachment to the housing 2. The shell 6 is fixed to the housing 2 in such a manner that an end portion 61a of the main body 61 on the side opposite to the side of fitting to the partner connector is inserted and placed into an annular recessed groove 27 provided at the housing 2 and the fixing pieces 65 are press-fitted in through-holes 26 (see, e.g., FIG. 9 as described later) of the housing 2 by means of press-fitting protrusions 65a protruding from sides of the fixing pieces 65.

When the shell 6 is placed at a predetermined position of the housing 2, a fitting space 60a in which part of the partner connector is to be fitted is formed among an inner wall 63a of the main body 61, the plate-shaped body 30, such as one plate surface 30A and the other plate surface 30B, of the plate-shaped body 30 of the housing 2, and the terminals 41. For example, lock holes 64 at which predetermined portions of the partner connector fitted in the fitting space 60a are locked are provided as through-holes at the main body 61. Moreover, at an outer wall of the main body 61, holding pieces 62 are provided in such a manner that part of a wall surface of the shell 6 is cut, raised, and bent slightly inward. With the holding pieces 62, the partner connector fitted in the fitting space 60a can electrically contact the shell 6, and through such contact, the partner connector can be connected to, e.g., ground.

The structure of the electric connector 1 will be described in more detail with reference to FIGS. 4 to 12.

Figure 8:
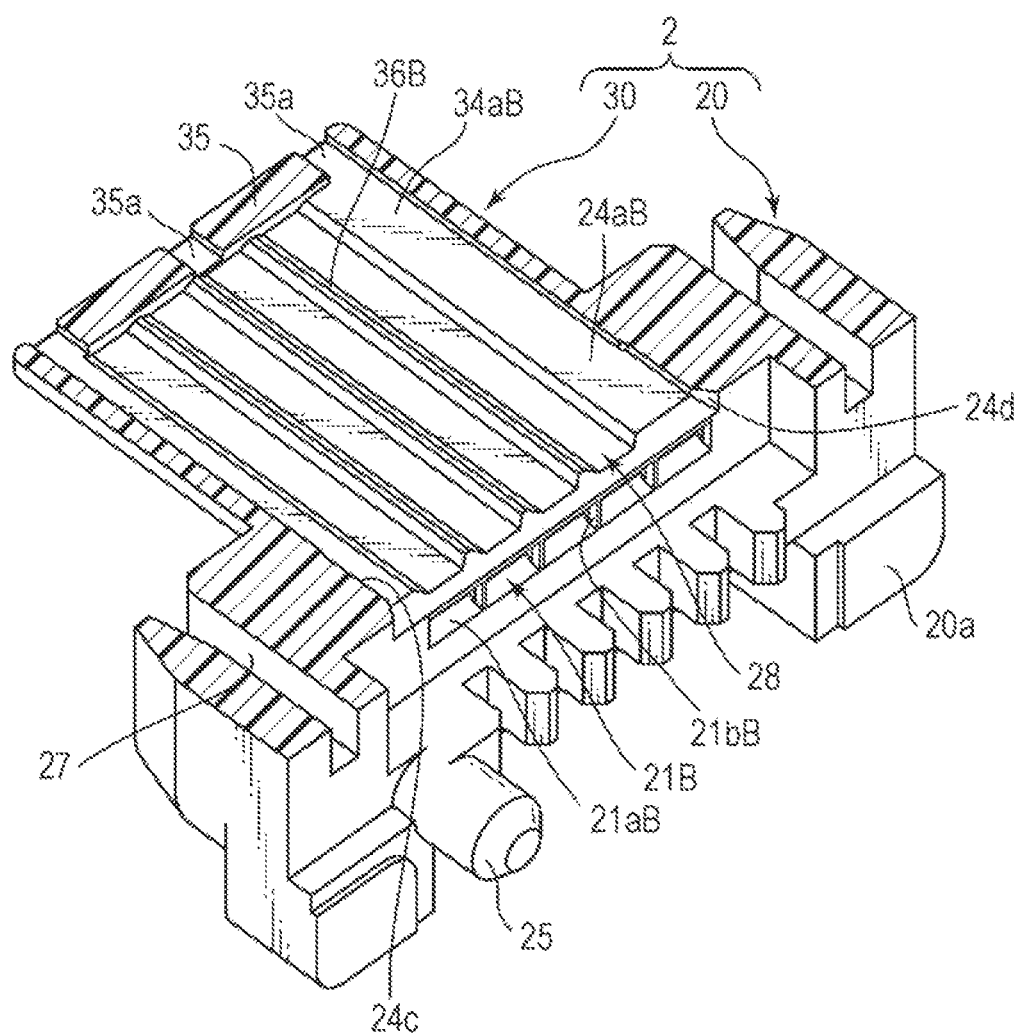
FIG. 8 is a perspective view of FIG. 7.
Figure 9:
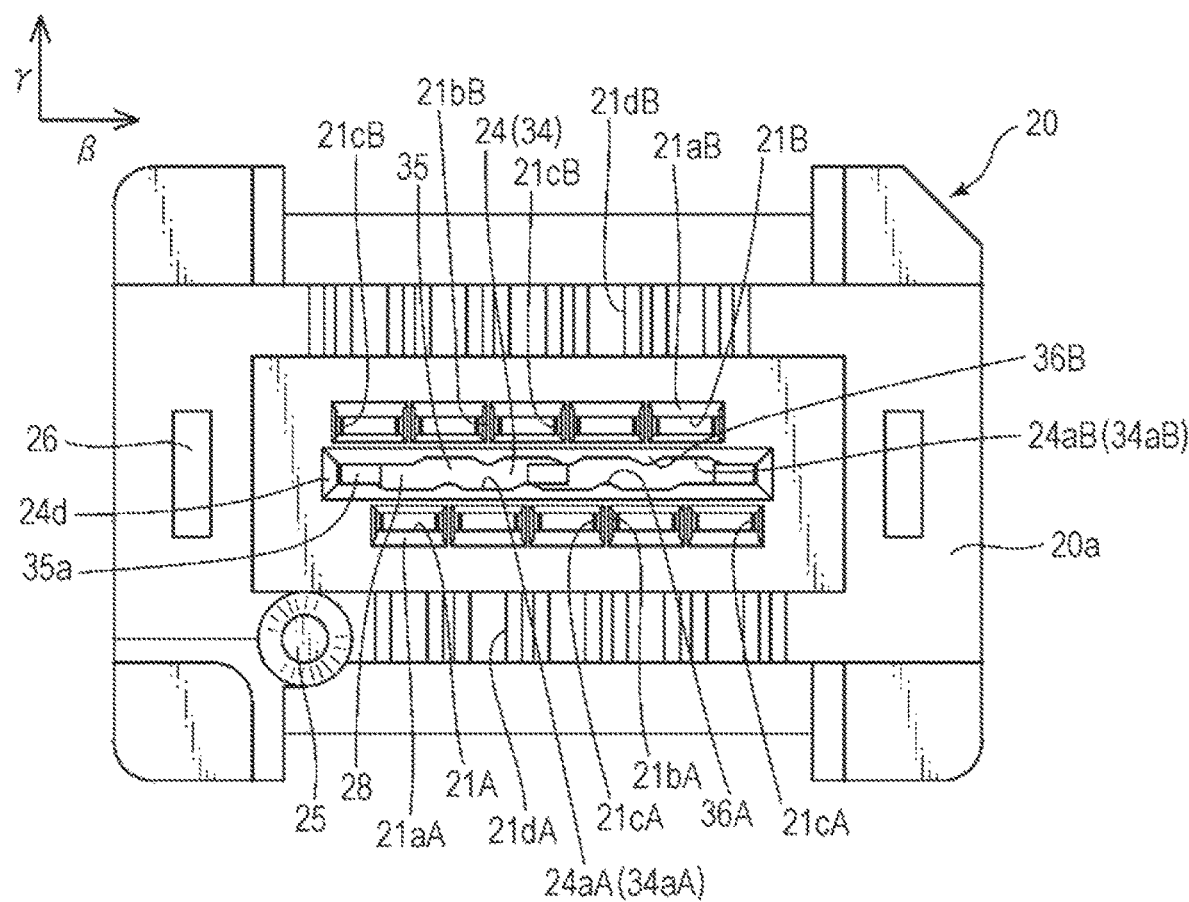
FIG. 9 is a bottom view of the housing used for the electric connector of FIG. 1.
Figure 10:
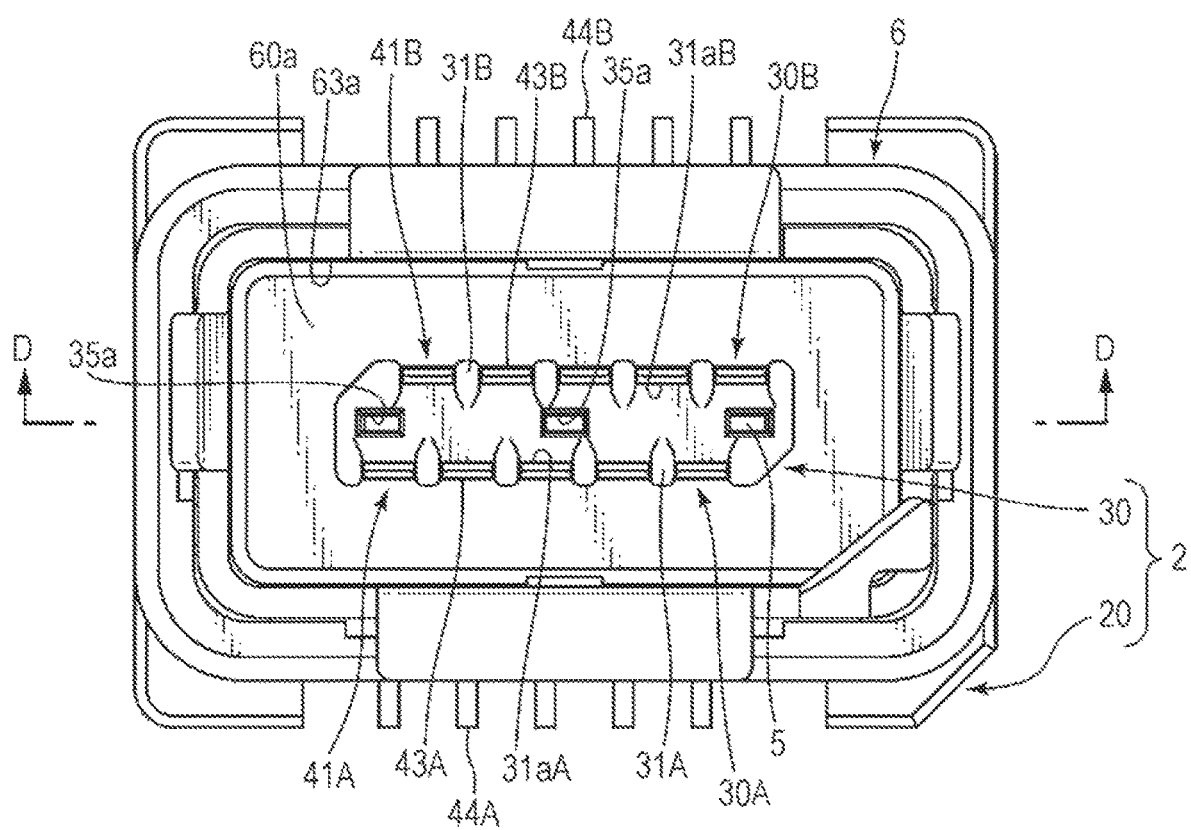
FIG. 10 is a plan view of the electric connector of FIG. 1.
Figure 11:
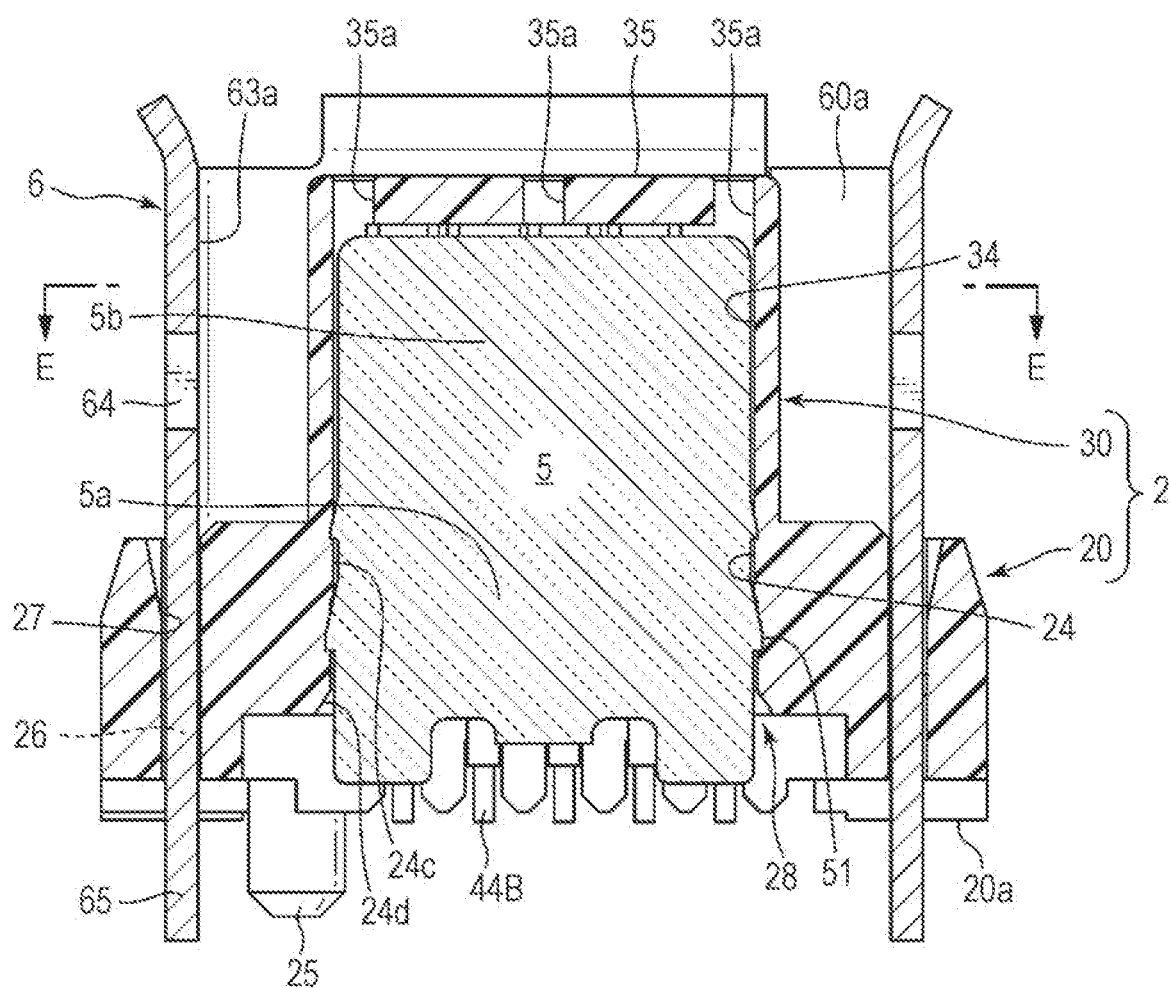
FIG. 11 is a sectional view along a D-D line of FIG. 10, the sectional view corresponding to FIG. 6.
Figure 12:
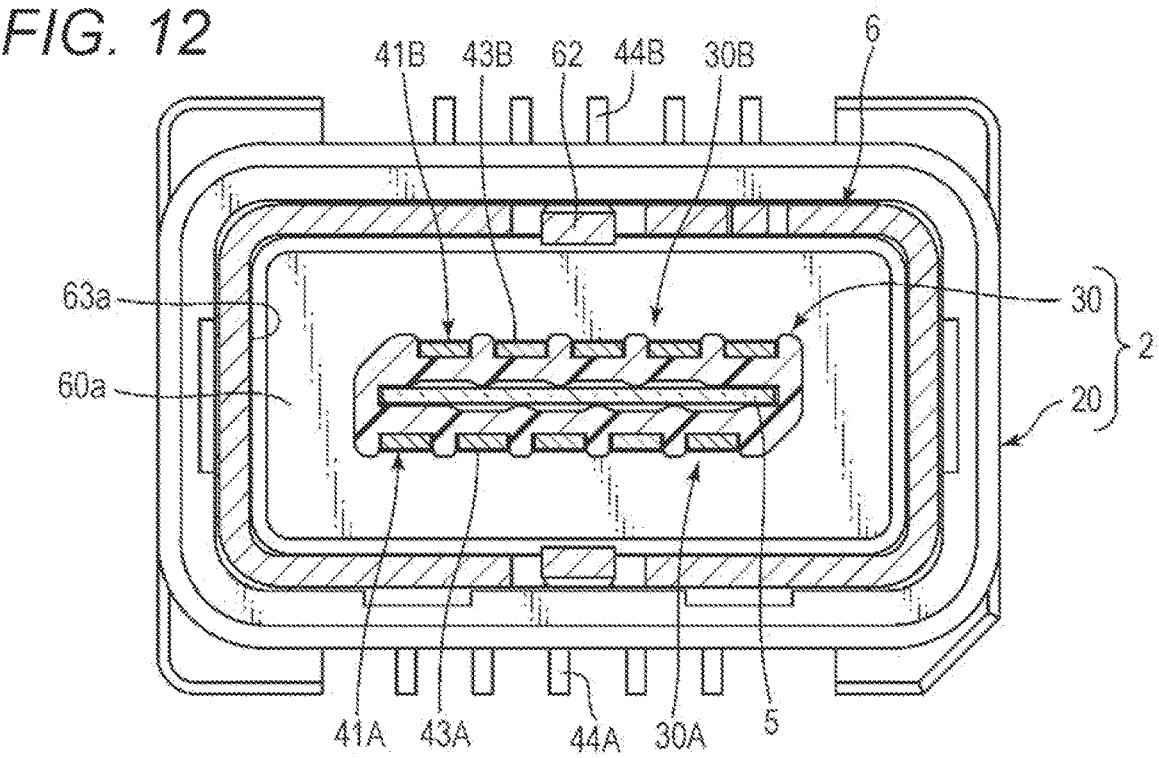
FIG. 12 is a sectional view along an E-E line of FIG. 10.

FIGS. 4 to 9 are views of the individual housing 2. FIGS. 10 to 12 illustrate the electric connector 1 as a finished article as in FIG. 1.

Figure 4:
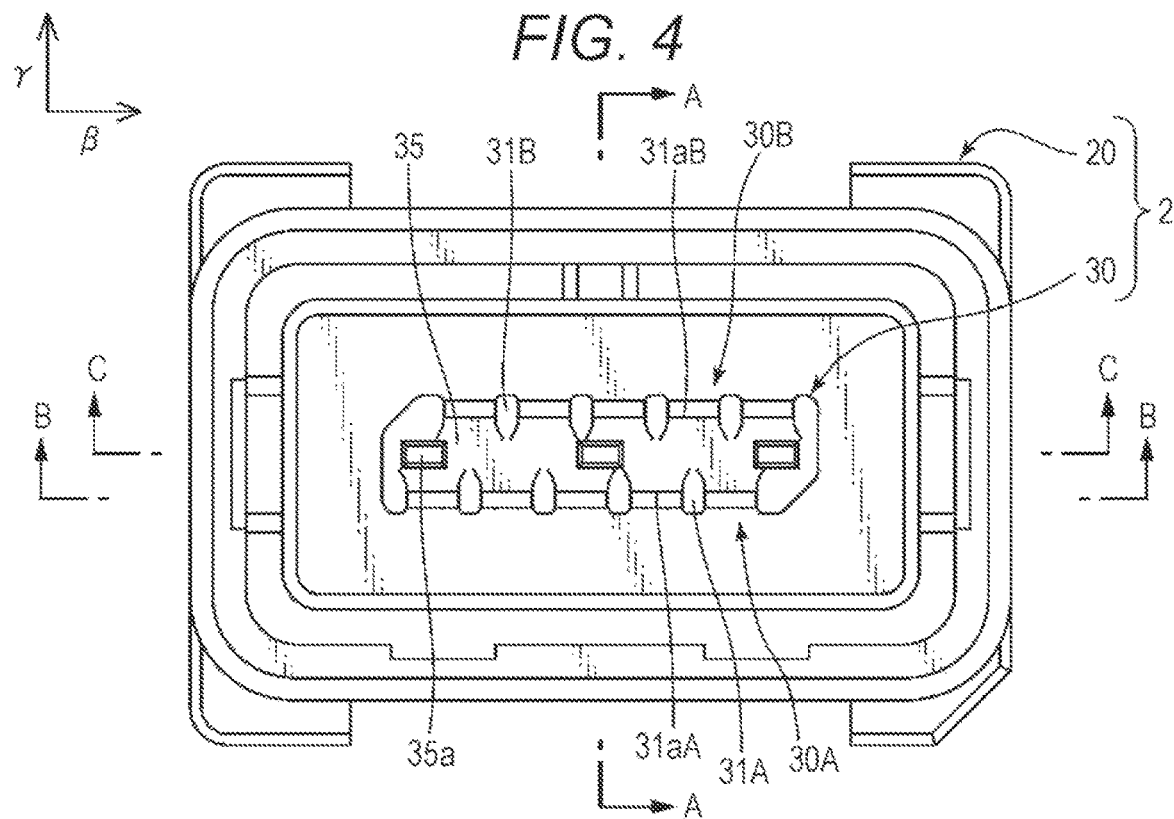
FIG. 4 is a plan view of a housing used for the electric connector of FIG. 1.
Figure 5:
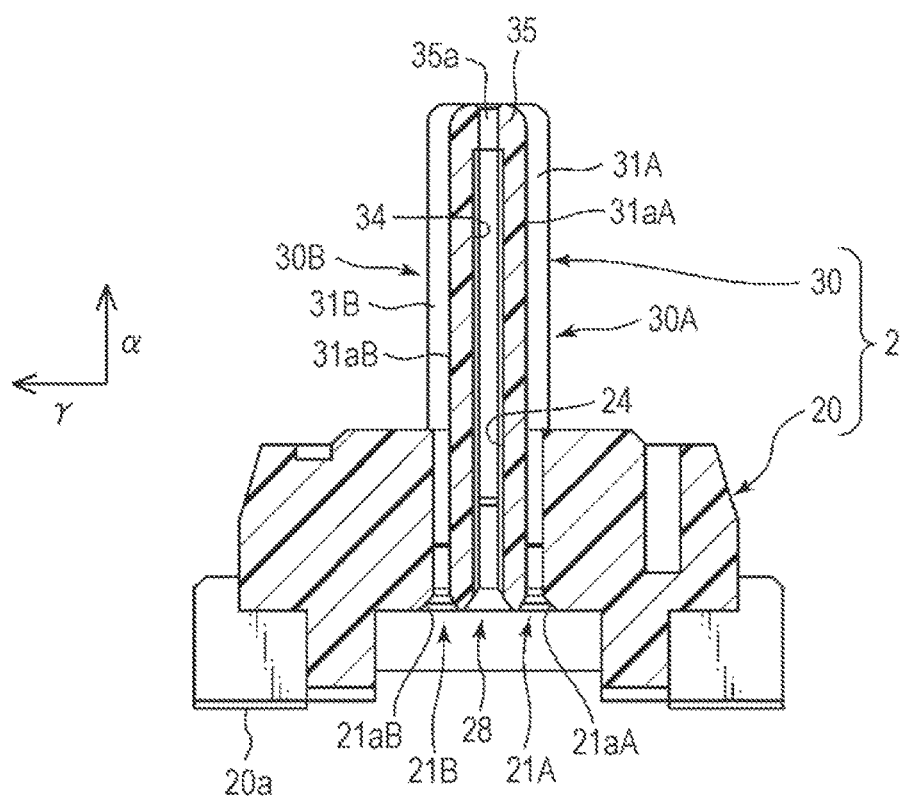
FIG. 5 is a sectional view along an A-A line of FIG. 4.
Figure 6:
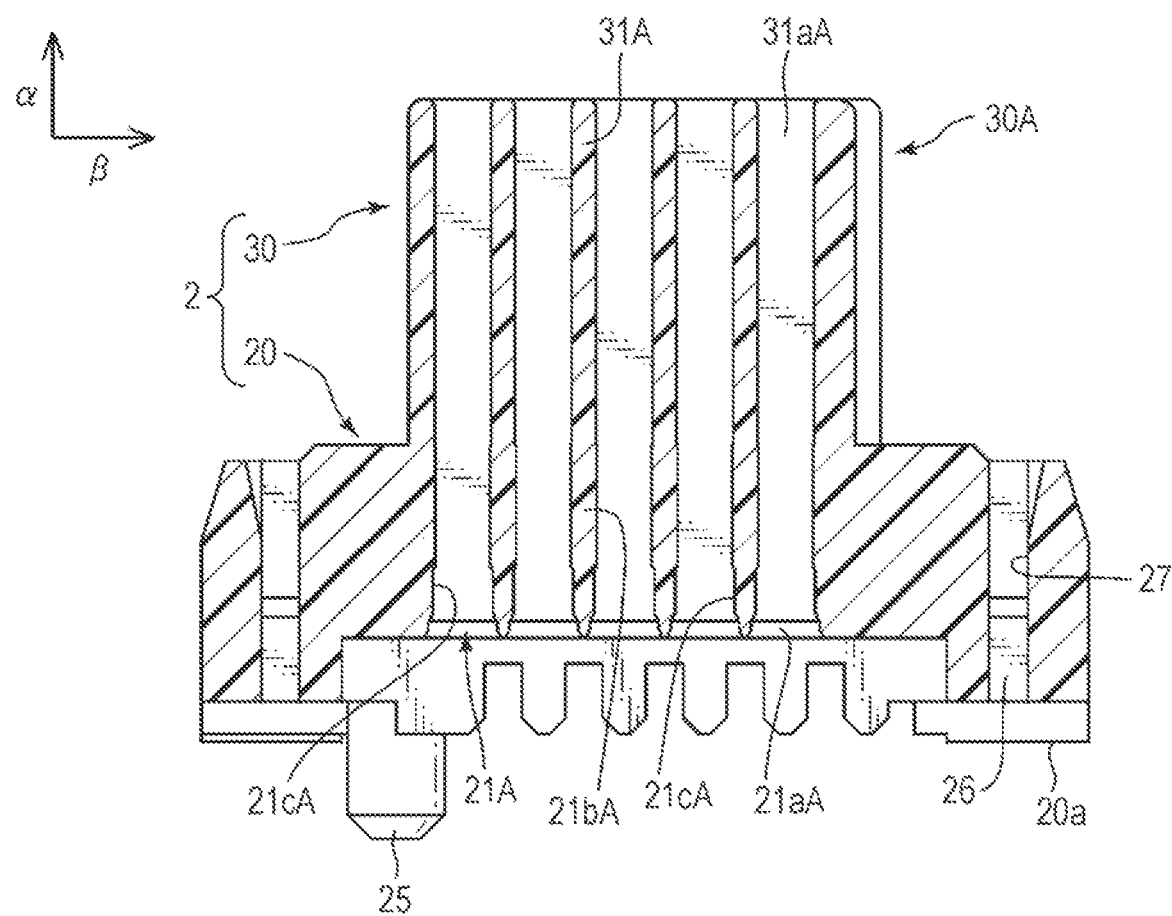
FIG. 6 is a sectional view along a B-B line of FIG. 4.
Figure 7:
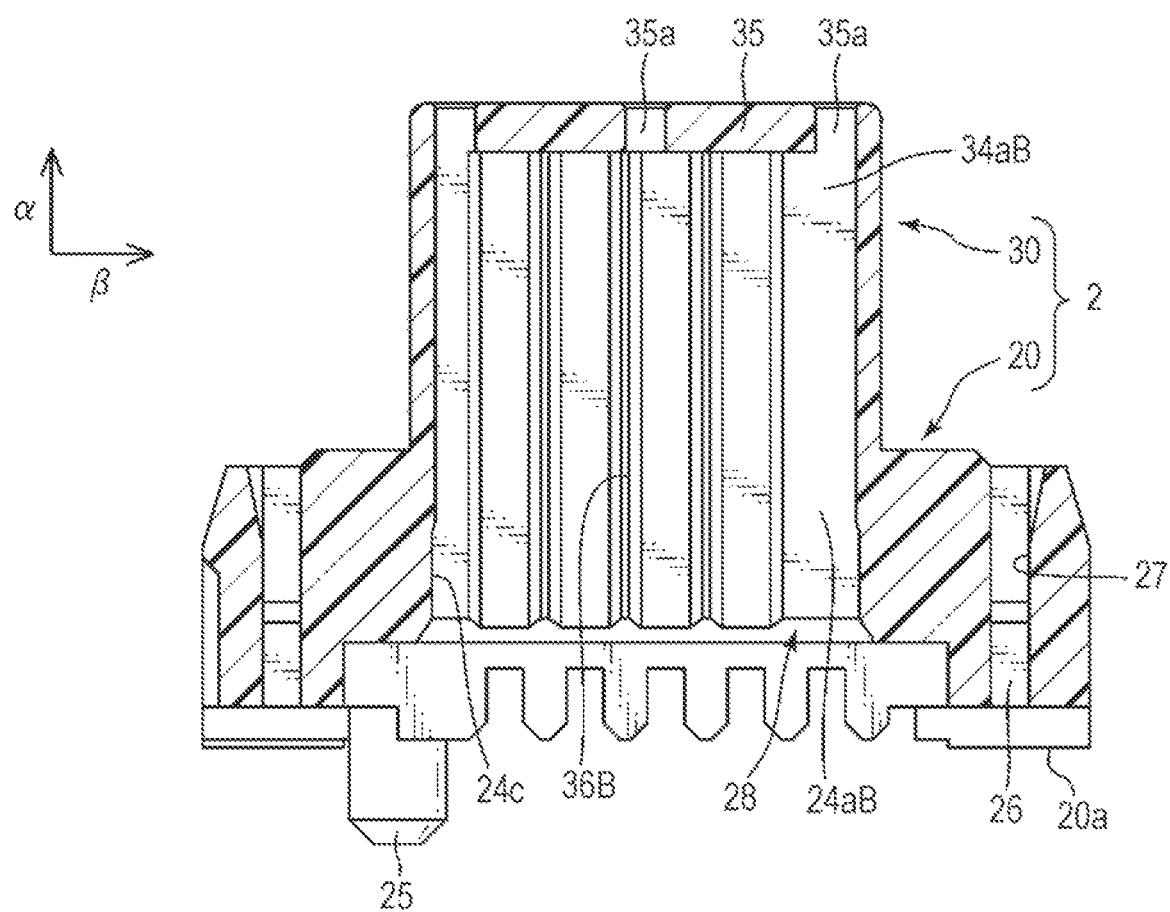
FIG. 7 is a sectional view along a C-C line of FIG. 4.

More specifically, FIG. 4 is a plan view of the housing 2. FIG. 5 is a sectional view along an A-A line of FIG. 4. FIG. 6 is a sectional view along a B-B line of FIG. 4. FIG. 7 is a sectional view along a C-C line of FIG. 4. FIG. 8 is a perspective view of FIG. 7. FIG. 9 is a bottom view of the housing 2. FIG. 10 is a plan view of the electric connector 1. FIG. 11 is a sectional view along a D-D line of FIG. 10, the sectional view corresponding to FIG. 6. FIG. 12 is a sectional view along an line of FIG. 10.

FIG. 6 illustrates the side of one plate surface 30A. Moreover, FIGS. 7, 8, and 11 illustrate the side of the other plate surface 30B. As described above, the electric connector 1 has, except for the plate-shaped body 30, the bisymmetrical shape, and the plate-shaped body 30 has the point symmetrical shape as viewed in plane. Thus, one surface 30A and the other surface 30B can be taken as similar surfaces.

As illustrated in, e.g., FIGS. 4 to 6, 10, and 12, multiple first protruding portions 31A form, on one plate surface 30A of the plate-shaped body 30, multiple first grooves 31aA in which the first terminals 41A are arranged. These first grooves 31aA are provided continuously to one plate surface 30A in the fitting-release direction "α." Moreover, these first grooves 31aA are arrayed with the first grooves 31aA being separated from each other at equal intervals in the direction "β" perpendicular to the fitting-release direction "α."

Similarly, multiple second protruding portions 31B form, on the other plate surface 30B, multiple second grooves 31aB in which the second terminals 41B are arranged. These second grooves 31aB are provided continuously to the other plate surface 30B in the fitting-release direction "α." Moreover, these second grooves 31aB are arrayed with the second grooves 31aB being separated from each other at equal intervals in the direction "β" perpendicular to the fitting-release direction "α."

As illustrated in, e.g., FIG. 9 in addition to FIGS. 5 and 6, multiple first terminal insertion holes 21A into which the first terminals 41A are inserted are provided at the base 20 along the fitting-release direction "α." The first terminals 41A are each inserted into these first terminal insertion holes 21A. Five first terminal insertion holes 21A in total are, along the right-left direction "β," formed corresponding to the number of first terminals 41A, e.g., five terminals in this embodiment.

These terminal insertion holes 21A are, in the "β" direction, divided from each other by first walls 21bA. Moreover, these first walls 21bA are provided along the fitting-release direction "α" in a state in which each first wall 21bA is aligned with the first protruding portion 31A provided on one plate surface 30A of the plate-shaped body 30. As a result, each first terminal insertion hole 21A is, in the fitting-release direction "α," continuous to a corresponding one of the multiple first grooves 31aA formed at one plate surface 30A of the plate-shaped body 30 such that the first terminals 41A are each arranged in the first grooves 31aA. Utilizing the first terminal insertion holes 21A and the first grooves 31aA, the first terminals 41A are reliably arranged at predetermined positions on the base 20 and the plate-shaped body 30.

For facilitating terminal insertion, a tapered portion 21aA is provided in the vicinity of an inlet at each terminal insertion hole 21A. The first terminal 41A is, at the contact portion 43 thereof (see FIG. 3), inserted into the first terminal insertion hole 21A through the tapered portion 21aA. The first terminal 41A is, at the press-fitting portion 21 thereof, press-fitted in a press-fitting portion 21cA of the first terminal insertion hole 21A. Utilizing the press-fitting protrusions 42aA protruding to the side of the press-fitting portion 21, the first terminal 41A is fixed to the press-fitting portion 21cA. In this state, the mounting portion 44 of the first terminal 41A is arranged in a recessed groove 21dA dug corresponding to each first terminal insertion hole 21A at the bottom surface 20a of the base 20.

Similarly, multiple second terminal insertion holes 21B into which the second terminals 41B are inserted are provided along the fitting-release direction "α" at the base 20. The second terminals 41B are each inserted into these second terminal insertion holes 21B. Five first terminal insertion holes 21B are, along the right-left direction "β," formed corresponding to the number of second terminals 41B.

These second terminal insertion holes 21B are, in the "β" direction, divided from each other by second walls 21bB. Moreover, these second walls 21bB are provided along the fitting-release direction "α" in a state in which each second wall 21bB is aligned with the first protruding portion 31B provided on the other plate surface 30B of the plate-shaped body 30. As a result, each second terminal insertion hole 21B is, in the fitting-release direction "α," continuous to a corresponding one of the multiple second grooves 31aB formed at the other plate surface 30B of the plate-shaped body 30 such that the second terminals 41B are each arranged in the second grooves 31aB. Utilizing the second terminal insertion holes 21B and the first grooves 31aB, the second terminals 41B are reliably arranged at predetermined positions on the base 20 and the plate-shaped body 30.

For facilitating terminal insertion, a tapered portion 21aB is provided in the vicinity of an inlet at each terminal insertion hole 21B. The first terminal 41B is, at the contact portion 43 thereof (see FIG. 3), inserted into the first terminal insertion hole 21B through the tapered portion 21aB. The first terminal 41B is, at the press-fitting portion 21 thereof, press-fitted in a press-fitting portion 21cB of the first terminal insertion hole 21B. Utilizing the press-fitting protrusions 42aB protruding to the side of the press-fitting portion 21, the first terminal 41B is fixed to the press-fitting portion 21cB. In this state, the mounting portion 44 of the second terminal 41B is arranged in a recessed groove 21dB dug corresponding to each second terminal insertion hole 21B at the bottom surface 20a of the base 20.

In some cases, when the terminals are inserted into the first and second terminal insertion holes 21A, 21B, a great load is on the first walls 21bA dividing the first terminal insertion holes 21A from each other or the second walls 21bB dividing the second terminal insertion holes 21B from each other, specifically the press-fitting portions 21cA or the second press-fitting portions 21cB. For preventing damage of part of the housing 2 among the first and second terminal insertion holes 21A, 21B and a housing space 24 due to the load, reinforcing portions 36A, 36B having a great resin thickness are provided.

The first reinforcing portions 36A are preferably provided at positions close to the first walls 21bA in an in-plane direction "β-γ" perpendicular to the fitting-release direction "α," such as positions facing each other in a thickness direction of a plate forming the housing space 24, 34. Specifically, the first reinforcing portion 36A is preferably provided close to the first press-fitting portion 21cA. On an inner wall 24aA of a first housing portion 24A on the side of one plate surface 30A and an inner wall 34aA of a second housing portion 34 on the side of one plate surface 30A along a plate surface direction "α-β" of the plate-shaped body 30, the first reinforcing portions 36A separated from each other in the "β" direction are provided to protrude from the inner walls 24aA, 34aA toward the inside of the first housing portion 24 and the second housing portion 34.

Similarly, the second reinforcing portions 36B are preferably provided at positions close to the second walls 21bB in the in-plane direction "β-γ" perpendicular to the fitting-release direction "α," such as opposing positions in the thickness direction on the front and back sides of the plate forming the housing space 24, 34. Specifically, the second reinforcing portion 36B is preferably provided close to the second press-fitting portion 21cB. On an inner wall 24aB of a first housing portion 24B on the side of the other plate surface 30B and an inner wall 34aB of a second housing portion 34B on the side of one plate surface 30B along the plate surface direction "α-β" of the plate-shaped body 30, the second reinforcing portions 36B separated from each other in the "β" direction are provided to protrude from the inner walls 24aB, 34aB toward the inside of the first housing portion 24 and the second housing portion 34.

As clearly illustrated in, e.g., FIGS. 5, 7, 8, and 11, the base 20 of the housing 2 has the substantially plate-shaped first housing portion 24 housing part 5a of the shield 5 (see FIG. 11). Moreover, the plate-shaped body 30 of the housing 2 has the substantially plate-shaped second housing portion 34 housing another part 5b of the shield 5 (see FIG. 11). The first housing portion 24 and the second housing portion 34 form one housing space 24, 34 for housing the shield 5 in a state in which these portions are communicated with each other in the direction "α" of fitting to or release from the partner connector.

As clearly illustrated in FIG. 9 in addition to, e.g., FIG. 5, a shield insertion hole 28 into which the shield 5 is inserted is provided at an inlet of the housing space 24, 34 at the base 20. The shield 5 is inserted into one housing space formed by the first housing portion 24 and the second housing portion 34 through the shield insertion hole 28 along the fitting-release direction "α" from the lower side to the upper side, i.e., from the side opposite to the side of fitting to the partner connector to the fitting side. For facilitating terminal insertion, a tapered portion 24d is preferably provided in the vicinity of an inlet at the shield insertion hole 28. Utilizing a press-fitting protrusion 51 (see FIGS. 2 and 11) provided at the side of the shield 5 inserted through the tapered portion 24d, the shield 5 is press-fitted in a press-fitting portion 24c (see FIG. 11) of the first housing portion 24, and is fixed at a predetermined position on the first housing portion 24.

As described above, the shield 5 is extremely thin. Thus, the housing space 24, 34 in which the shield 5 is housed is also extremely thin, and for example, has only a thickness of about 0.1 to 0.4 mm. In a case where the housing space 24, 34 is formed by injection molding, a die for forming the housing space 24, 34 is also extremely thin, corresponding to the shape and size of the housing space 24, 34. As a result, due to damage of the die upon application of resin into the die and position displacement of the die caused by the pressure of injected resin, it might be difficult to accurately control the shape and size of the housing space.

In the present embodiment, for preventing damage and position displacement of the die, injection molding is performed in a state in which a die for forming the housing space 24, 34, specifically a die portion for forming the second housing portion 34, is held by a die portion extending from an end wall 35 of the plate-shaped body 30 positioned on the side of fitting to the partner connector. As a result of injection molding performed in this method, the second housing portion 34 is, in the fitting-release direction "α," communicated with the through-holes 35a provided at the end wall 35 of the plate-shaped body 30. The through-hole 35a is a hole formed by the die portion extending from the end wall 35 of the plate-shaped body 30. In injection molding, the die portion extending through the through-holes 35a holds the die for forming the housing space 24, 34, specifically the die portion for forming the second housing portion 34. With this configuration, damage and position displacement of the die (the die portion) can be effectively prevented. Further, the electric connector having the housing space 24, 34 formed with the accurately-controlled shape and size for the shield 5 can be provided. The through-holes 35a are provided at three locations in the right-left direction "β." The through-holes 35a are positioned at both end portions and a center portion of the housing space 24, 34.

Note that the first reinforcing portions 36A and the second reinforcing portions 36B provided on the inner walls 24aA, 24aB of the first housing portion 24A and the inner walls 34aA, 34aB of the second housing portion 34 are not necessarily provided to partially protrude from the inner walls. The plate thickness can be increased by the entirety of the reinforcing portions. However, in this case, the thickness of the housing space 24, 34 is decreased by such a plate thickness increment. As a result, the die for forming the housing space 24, 34 is thinned. For this reason, in the present embodiment, the form in which the reinforcing portions only partially protrude is employed.

Figure 13:
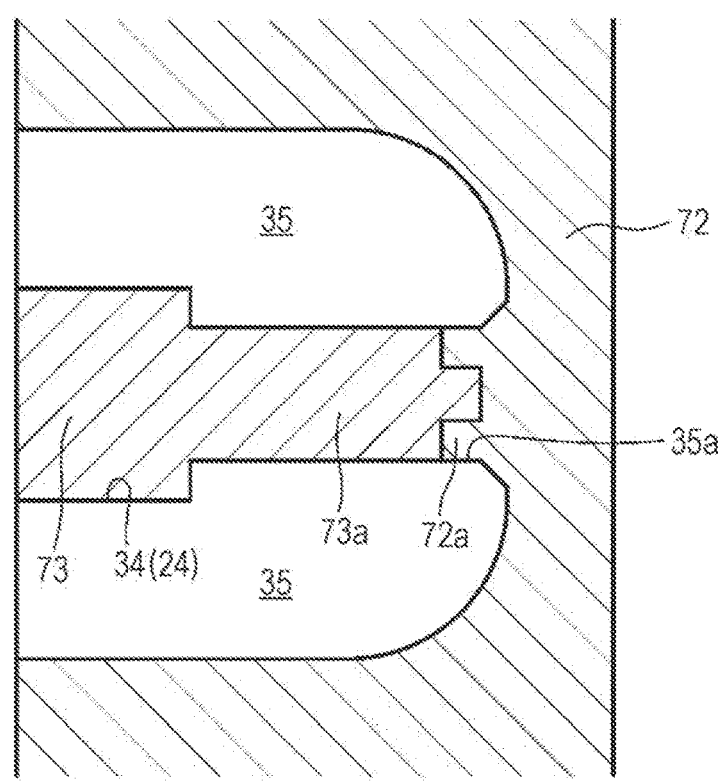
FIG. 13 is a sectional view illustrating one example of a die applicable to manufacturing of the housing used for the electric connector of FIG. 1.

FIG. 13 illustrates a sectional view of one example of a die applicable for manufacturing the housing 2. Specifically, this figure illustrates, as a sectional view corresponding to FIG. 5, a die for forming the vicinity of the through-holes 35a provided at the end wall 35 of the plate-shaped body 30.

The die for forming this portion includes at least a first die 72 and a second die 73. The first die 72 defines at least part of an outer surface of the end wall 35 of the plate-shaped body 30 and part of the through-holes 35a provided at the end wall 35. The second die 73 defines the housing space 34 (24) for housing the shield 5 and the remaining part of the through-holes 35a provided at the end wall 35. Needless to say, these dies may be divided as necessary, considering a die cutting process.

In a state in which a first portion 72a of the first die 72 for defining part of the through-holes 35a provided at the end wall 35 and a second portion 73a of the second die 73 for forming the remaining part of the through-holes 35a provided at the end wall 35 are coupled to each other, a space (34, 24, 35a) formed by the first die 72 and the second die 73 is filled with resin, and in this manner, the housing 2 can be manufactured. In this manner, the housing space 34 (24) and the end wall 35 having the through-holes 35a are formed. Note that the first portion 72a and the second portion 73a can be coupled to each other by an inlay (fitting) structure. By employing the inlay structure as described above, damage, deformation, and position displacement of the second die 73 can be reliably prevented even if the second die 73 is an extremely-thin plate-shaped body expanding in the in-plane direction "α-β." Thus, the space (24, 34) can be formed with accurate precision. Moreover, the shield 5 can be, with high precision, housed at a predetermined position in the housing portion (24, 34).

Description above relates to the preferred embodiment, and it should be understood that description above merely represents an article and the method for manufacturing the article. It can be recognized that modification and correction into different embodiments are obvious to those skilled in the art in light of teaching above. Thus, exemplary embodiments and substitute embodiments can be implemented without departing from the spirit of the article and the method described in the attached claims.

LIST OF REFERENCE SIGNS

2 Housing
5 Shield
20 Base
21A First terminal insertion hole
21B Second terminal insertion hole
21bA First wall
21bB Second wall
21cA First press-fitting portion
21cB Second press-fitting portion
24 First housing portion
24aA Inner wall
24aB Inner wall
30 Plate-shaped body
31A First protruding portion
31B Second protruding portion
31aA First groove
31aB Second groove
34 Second housing portion
34aA Inner wall
34aB Inner wall 35 End wall
35a Through-hole
36A First reinforcing portion
36B Second reinforcing portion
41A First, terminal
41B Second terminal
60 Shell
60a Fitting space

The invention claimed is:

1. An electric connector comprising:
a housing including a base and a plate-shaped body formed on a side of the base fitted to a partner connector;
multiple first terminals attached to the housing and provided in a state in which at least part of the multiple first terminals is exposed at one plate surface of the plate-shaped body and multiple second terminals provided in a state in which at least part of the multiple second terminals is exposed at the other plate surface of the plate-shaped body, the one plate surface and the other plate surface facing away from each other;
a shield attached to the housing and arranged among the multiple first terminals and the multiple second terminals in a thickness direction of the plate-shaped body; and
a metal shell attached to the housing and forming, between the one plate surface and the other plate surface, at least part of a fitting space in which part of the partner connector is to be fitted,
wherein the base has a first housing portion for housing part of the shield, the plate-shaped body has a second housing portion communicated with the first housing portion in a direction of fitting to or release from the partner connector and provided for housing another part of the shield, and
the second housing portion is, in the fitting-release direction, communicated with a through-hole provided at an end wall of the plate-shaped body positioned on a side of fitting to the partner connector, and
the multiple first terminals comprise multiple first mounting portions configured to be mounted to a substrate and the multiple second terminals comprise multiple second mounting portions configured to be mounted to the substrate, and the multiple first mounting portions are arranged in a direction opposite to the multiple second mounting portions.

2. The electric connector according to claim 1, wherein the base has, along the fitting-release direction, multiple first terminal insertion holes into which the multiple first terminals are to be inserted and multiple second terminal insertion holes into which the multiple second terminals are inserted,
the multiple first terminal insertion holes are, in the fitting-release direction, continuous to multiple first grooves formed at the one plate surface such that the multiple first terminals are each arranged in the multiple first grooves, and the multiple first grooves are arrayed separately from each other at the one plate surface, and
the multiple second terminal insertion holes are, in the fitting-release direction, continuous to multiple second grooves formed at the other plate surface such that the multiple second terminals are each arranged in the multiple second grooves, and the multiple second grooves are arrayed separately from each other at the other plate surface.

3. The electric connector according to claim 2, wherein at the one plate surface, multiple first protruding portions forming at least part of the multiple first grooves are provided along the fitting-release direction in a state in which the multiple first protruding portions are aligned with a first wall dividing the multiple first terminal insertion holes from each other in a direction perpendicular to the fitting-release direction, and
at the other plate surface, multiple second protruding portions forming at least part of the multiple second grooves are provided along the fitting-release direction in a state in which the multiple second protruding portions are aligned with a second wall dividing the multiple second terminal insertion holes from each other in the direction $\beta$ perpendicular to the fitting-release direction.

4. An electric connector comprising:
a housing including a base and a plate-shaped body formed on a side of the base fitted to a partner connector;
multiple first terminals attached to the housing and provided in a state in which at least part of the multiple first terminals is exposed at one plate surface of the plate-shaped body and multiple second terminals provided in a state in which at least part of the multiple second terminals is exposed at the other plate surface of the plate-shaped body, the one plate surface and the other plate surface facing away from each other;
a shield attached to the housing and arranged among the multiple first terminals and the multiple second terminals in a thickness direction of the plate-shaped body; and
a metal shell attached to the housing and forming, between the one plate surface and the other plate surface, at least part of a fitting space in which part of the partner connector is to be fitted,
wherein the base has a first housing portion for housing part of the shield,
the plate-shaped body has a second housing portion communicated with the first housing portion in a direction of fitting to or release from the partner connector and provided for housing another part of the shield,
the second housing portion is, in the fitting-release direction, communicated with a through-hole provided at an end wall of the plate-shaped body positioned on a side of fitting to the partner connector,
the base has, along the fitting-release direction, multiple first terminal insertion holes into which the multiple first terminals are to be inserted and multiple second terminal insertion holes into which the multiple second terminals are inserted,
the multiple first terminal insertion holes are, in the fitting-release direction, continuous to multiple first grooves formed at the one plate surface such that the multiple first terminals are each arranged in the multiple first grooves, and the multiple first grooves are arrayed separately from each other at the one plate surface,
the multiple second terminal insertion holes are, in the fitting-release direction, continuous to multiple second grooves formed at the other plate surface such that the multiple second terminals are each arranged in the multiple second grooves, and the multiple second grooves are arrayed separately from each other at the other plate surface, at the one plate surface, multiple first protruding portions forming at least part of the multiple first grooves are provided along the fitting-release direction in a state in which the multiple first protruding portions are aligned with a first wall dividing the multiple first terminal insertion holes from each other in a direction perpendicular to the fitting-release direction, at the other plate surface, multiple second protruding portions forming at least part of the multiple second grooves are provided along the fitting-release direction in a state in which the multiple second protruding portions are aligned with a second wall dividing the multiple second terminal insertion holes from each other in the direction perpendicular to the fitting-release direction, on an inner wall of the first housing portion on a one-plate-surface side and an inner wall of the second housing portion on the one-plate-surface side along a plate surface direction of the plate-shaped body, multiple first reinforcing portions arrayed separately from each other in the direction perpendicular to the fitting-release direction are provided to protrude from the inner walls to an inside of the first housing portion and the second housing portion, on an inner wall of the first housing portion on an other-plate-surface side and an inner wall of the second housing portion on the other-plate-surface side along the plate surface direction of the plate-shaped body, multiple second reinforcing portions arrayed separately from each other in the direction perpendicular to the fitting-release direction are provided to protrude from the inner walls to the inside of the first housing portion and the second housing portion, and each of the multiple first reinforcing portion is arranged close to the first wall in an in-plane direction perpendicular to the fitting-release direction, and each of the multiple second reinforcing portions is arranged close to the second wall in the in-plane direction perpendicular to the fitting-release direction.

5. The electric connector according to claim 4, wherein a first press-fitting portion in which each of the first terminals is to be press-fitted is formed at each first terminal insertion hole, and the multiple first reinforcing portions are at least provided close to the first press-fitting portion, and a second press-fitting portion in which each of the second terminals is to be press-fitted is formed at each second terminal insertion hole, and the multiple second reinforcing portions are at least provided close to the second press-fitting portion.

6. A method for manufacturing a housing of the electric connector according to claim 1, comprising:

preparing at least a first die defining at least part of an outer surface of the end wall of the plate-shaped body and part of the through-hole provided at the end wall and a second die defining a housing space in which the shield is housed and the remaining part of the through-hole provided at the end wall; and manufacturing the housing by filling a space formed by the first die and the second die with resin in a state in which a first portion of the first die for defining the part of the through-hole provided at the end wall and a second portion of the second die for forming the remaining part of the through-hole provided at the end wall are coupled to each other.

7. An electric connector comprising:

a housing including a base and a plate-shaped body formed on a side of the base fitted to a partner connector;

multiple first terminals attached to the housing and provided in a state in which at least part of the multiple first terminals is exposed at one plate surface of the plate-shaped body and multiple second terminals provided in a state in which at least part of the multiple second terminals is exposed at the other plate surface of the plate-shaped body, the one plate surface and the other plate surface facing away from each other;

a shield attached to the housing and arranged among the multiple first terminals and the multiple second terminals in a thickness direction of the plate-shaped body; and a metal shell attached to the housing and forming, between the one plate surface and the other plate surface, at least part of a fitting space in which part of the partner connector is to be fitted, wherein the base has a first housing portion for housing part of the shield, the plate-shaped body has a second housing portion communicated with the first housing portion in a direction of fitting to or release from the partner connector and provided for housing another part of the shield, the second housing portion is, in the fitting-release direction, communicated with a through-hole provided at an end wall of the plate-shaped body positioned on a side of fitting to the partner connector, and the multiple first terminals have a same shape as the multiple second terminals.

* * * * *